(12) United States Patent
Meggiolan

(10) Patent No.: US 7,351,000 B2
(45) Date of Patent: Apr. 1, 2008

(54) RELEASABLY LOCKING DEVICE FOR A BICYCLE COMPONENT, IN PARTICULAR FOR A WHEEL, AND CLAMPING ELEMENT FOR THE SAME

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 306 days.

(21) Appl. No.: 11/136,237

(22) Filed: May 24, 2005

(65) Prior Publication Data

US 2005/0264097 A1    Dec. 1, 2005

(30) Foreign Application Priority Data

May 31, 2004  (EP)  ................... 04425402

(51) Int. Cl.
*F16B 21/00*    (2006.01)
(52) U.S. Cl. ................ 403/322.4; 403/322.1; 280/279; 301/110.5; 301/124.2
(58) Field of Classification Search ............... 403/321, 403/322.1, 322.4; 280/279; 301/110.5; 301/124.2
See application file for complete search history.

(56) References Cited

U.S. PATENT DOCUMENTS

| 4,400,038 A | 8/1983 | Hosokawa |
| 4,724,692 A | 2/1988 | Turin et al. |
| 4,906,053 A | 3/1990 | Kawai |
| 5,165,762 A | 11/1992 | Phillips |
| 5,409,321 A | 4/1995 | Chen |
| 5,479,836 A | 1/1996 | Chang |
| 5,622,412 A * | 4/1997 | Yamane .................... 301/124.2 |
| 5,865,560 A | 2/1999 | Mercat et al. |
| 6,004,064 A * | 12/1999 | Franz ....................... 403/322.4 |
| 6,474,900 B2 * | 11/2002 | Feng ........................ 403/322.4 |

FOREIGN PATENT DOCUMENTS

| CH | 257926 | 4/1949 |
| DE | 939 674 C | 3/1956 |
| DE | 91 01 600 U | 5/1991 |
| DE | 295 11 702 U1 | 9/1995 |
| EP | 0 658 472 A | 6/1995 |

* cited by examiner

*Primary Examiner*—Daniel P. Stodola
*Assistant Examiner*—Michael P. Ferguson
(74) *Attorney, Agent, or Firm*—Volpe and Koenig, PC

(57) ABSTRACT

A releasably locking device, and clamping element for such a device, secures a bicycle component to a bicycle frame. The device has a traction rod associated with a rotation cam extending in a housing. The rotation of the cam is driven by a lever-operated manual actuation system between a clamping operating position and a release position. The rotation cam has two ends that can be commanded into synchronous rotation through said lever-operated manual actuation system.

11 Claims, 11 Drawing Sheets

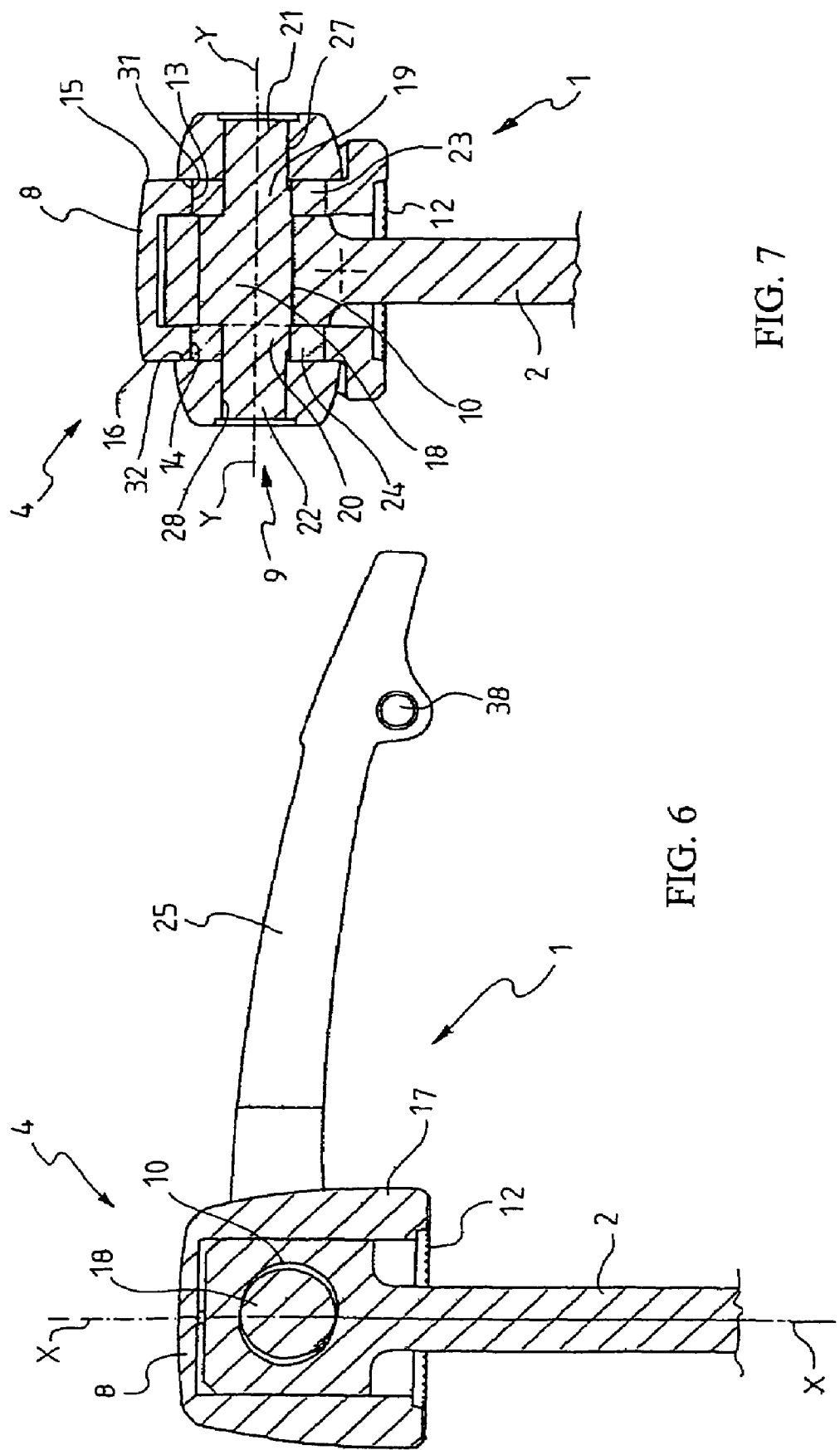

Figure 1:
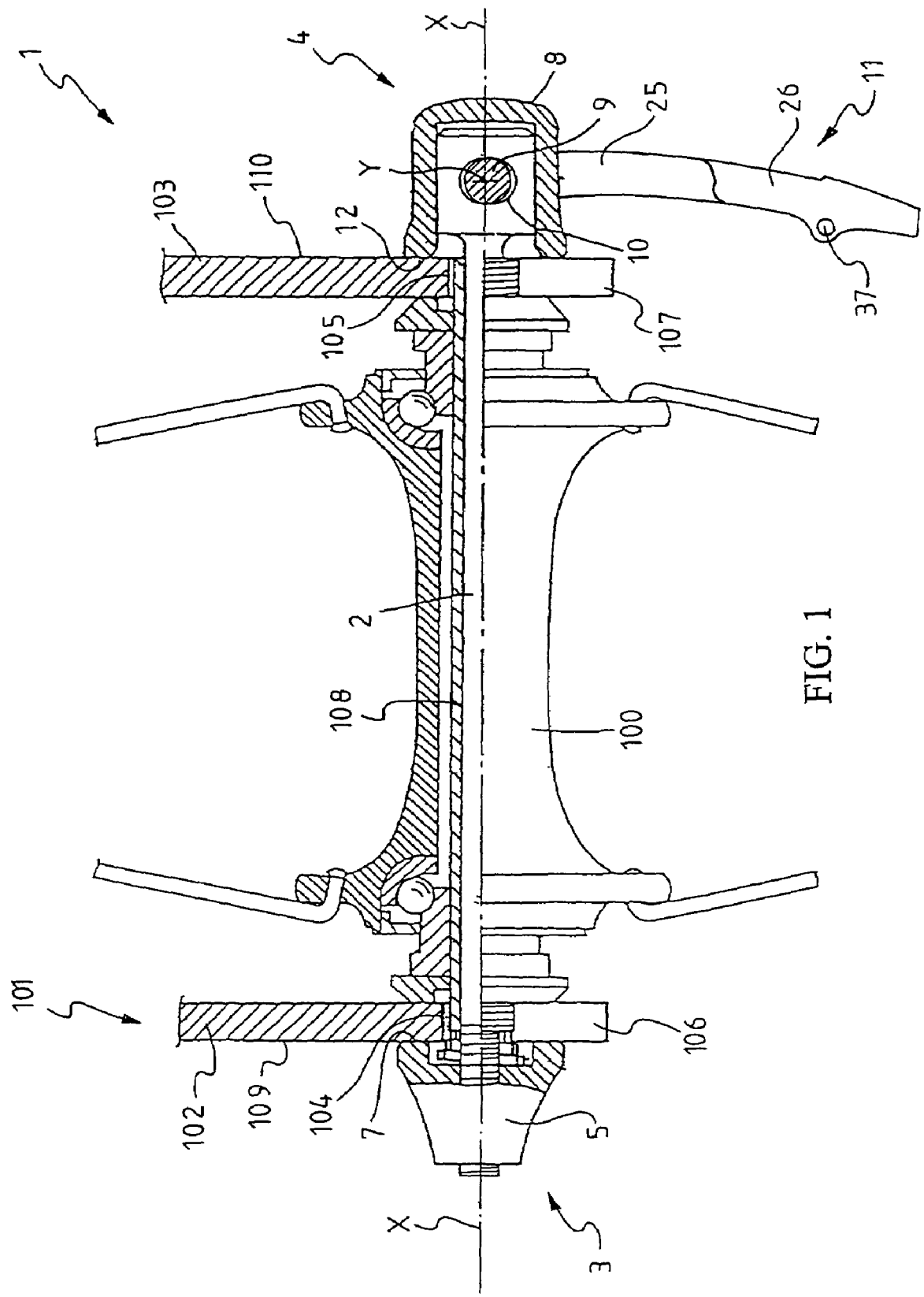

RELEASABLY LOCKING DEVICE FOR A BICYCLE COMPONENT, IN PARTICULAR FOR A WHEEL, AND CLAMPING ELEMENT FOR THE SAME

FIELD OF INVENTION

The present invention relates to a releasably locking device, in particular for securing the hub of a wheel to the frame of a bicycle, as well as a clamping element for such a device.

BACKGROUND

It is well known to provide a releasable lock of the wheels to the frame of a bicycle. Such a releaseable lock allows easy removal of the wheels themselves, for example for their replacement, for easing the transportation of the bicycle or as an anti-theft measure.

For this purpose, the ends of the branches of the front and rear forks of the frame of bicycles have a housing hole that is open through a slide slit.

When fixing the wheel to the frame, a traction rod extending in an axial through hole of the hub of the wheel is made to slide along the slide slits up to the housing holes at the ends of the branches of the fork. Clamping elements at the ends of the traction rod, projecting outside of the fork, are axially displaced closer to each other. These elements come into an abutment and clamping coupling against the outer surfaces of the branches of the fork, so as to secure the hub of the wheel to the frame. To release the hub, the clamping elements are axially displaced apart from each other, loosening the abutment and clamping coupling and allowing the sliding of the traction rod and therefore of the hub of the wheel outside of the housing holes of the fork.

A first of the clamping elements comprises a nut that can be screwed onto a threading at a first end of the traction rod.

The second of the clamping elements comprises a housing for a rotation cam extending in a hole at the second end of the traction rod, and an actuation lever for driving the rotation of the cam. The housing abuts against the outer surface of the fork on the frame.

Actuating the cam secures the hub to the frame by tensioning the traction rod.

In prior art locking devices, the actuation lever is connected to just one end of the rotation cam.

The Applicant has perceived that in such devices, during the actuation of the actuation lever, the rotation cam is also subjected to a torque with respect to a pivot point located at the end of the rotation cam opposite the end connected to the actuation lever, and that such a torque generates undesired stresses in the pivot point of the cam, which can lead to wearing and breaking of the cam.

SUMMARY

The technical problem at the basis of the present invention is to create a releasably locking device for a bicycle component that has increased mechanical strength and therefore an increased useful life.

A releasably locking device for securing a bicycle component to a bicycle frame comprises a traction rod associated with a rotation cam extending in a housing. Rotation of the cam between a clamping operating position and a release position is driven by a lever-operated manual actuation system. According to the invention, the rotation cam comprises two ends that can be commanded into synchronous rotation through said lever-operated manual actuation system.

BRIEF DESCRIPTION OF THE DRAWING(S)

Figure 2:
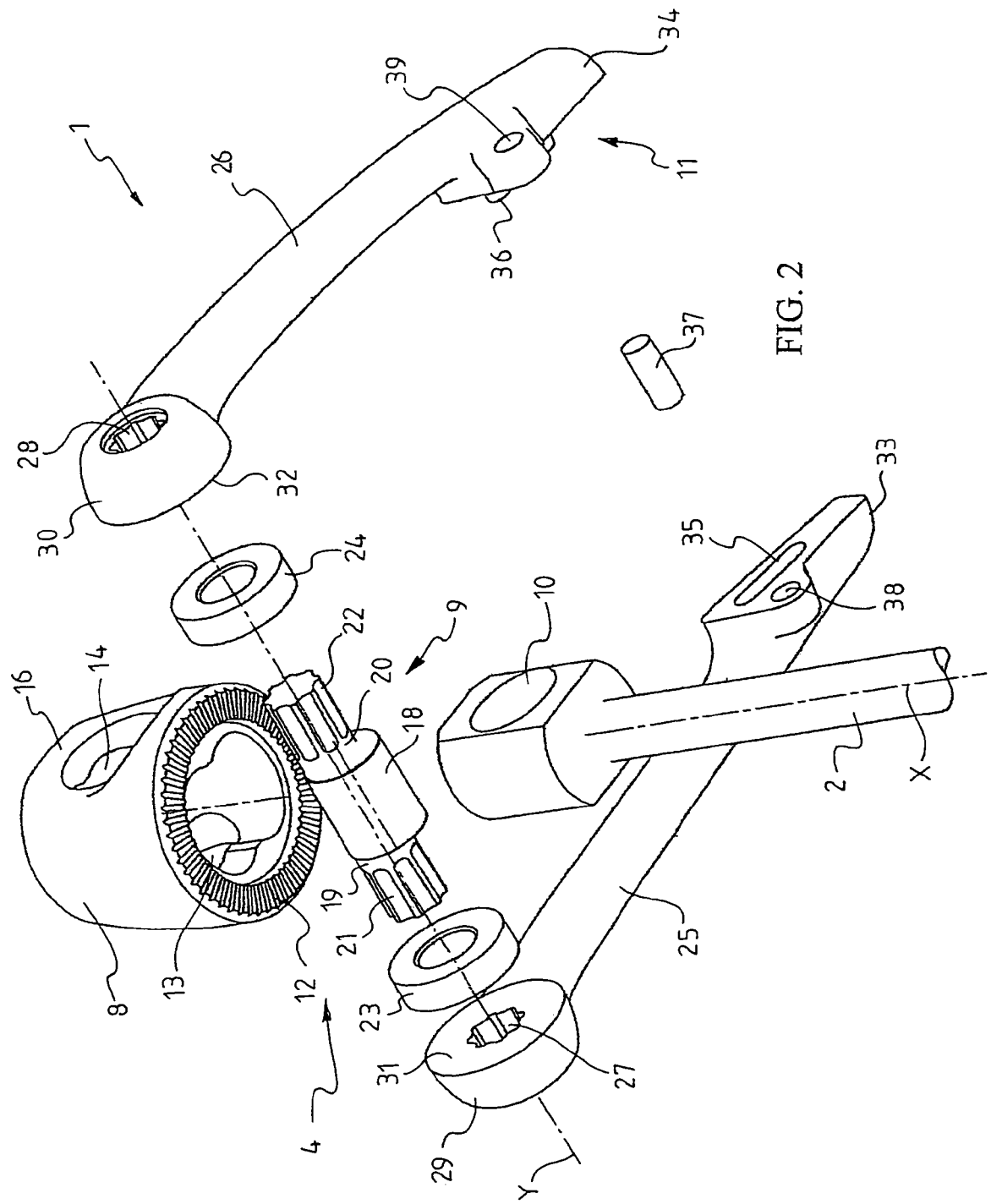
Figure 3:
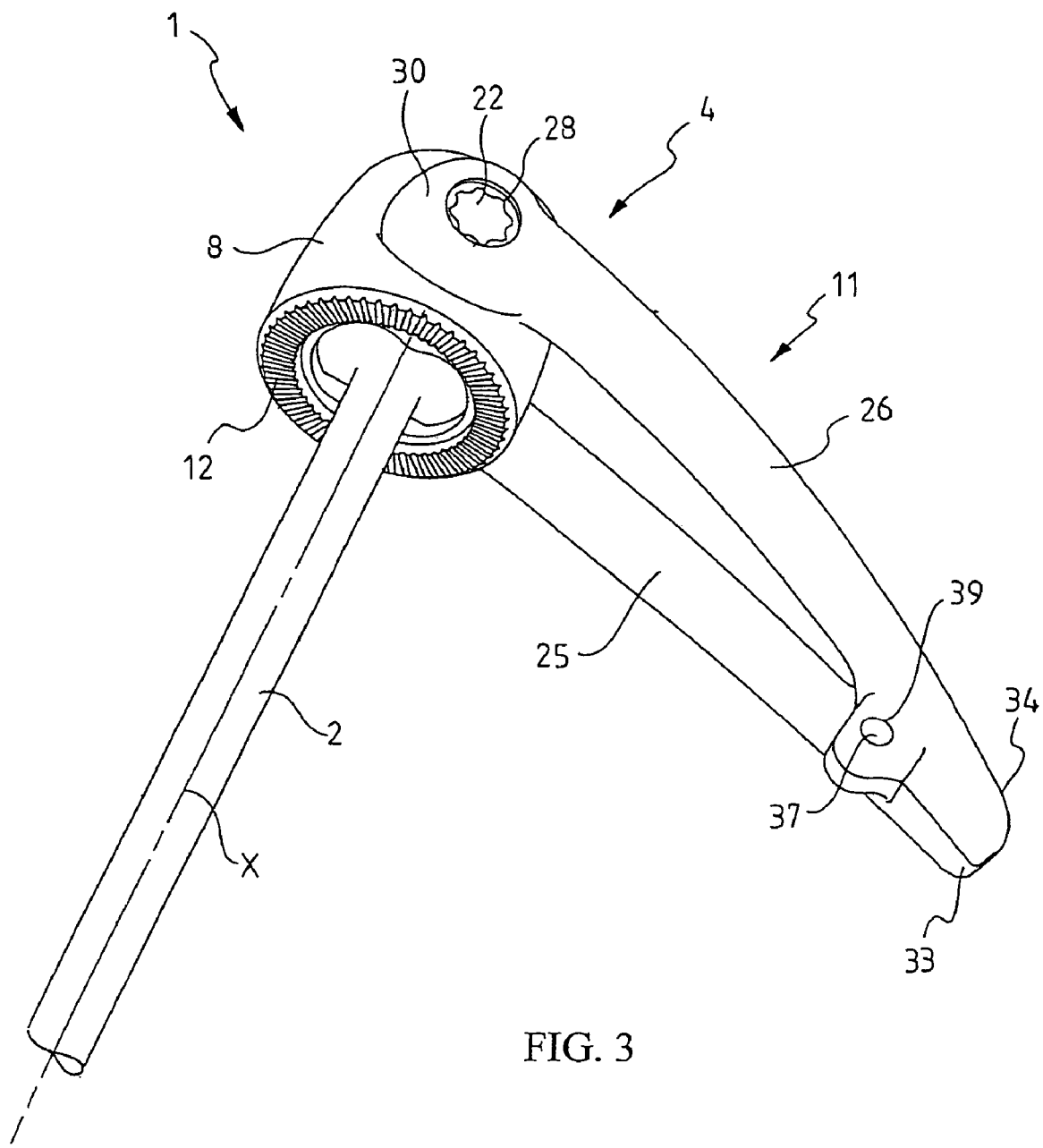
Figure 5:
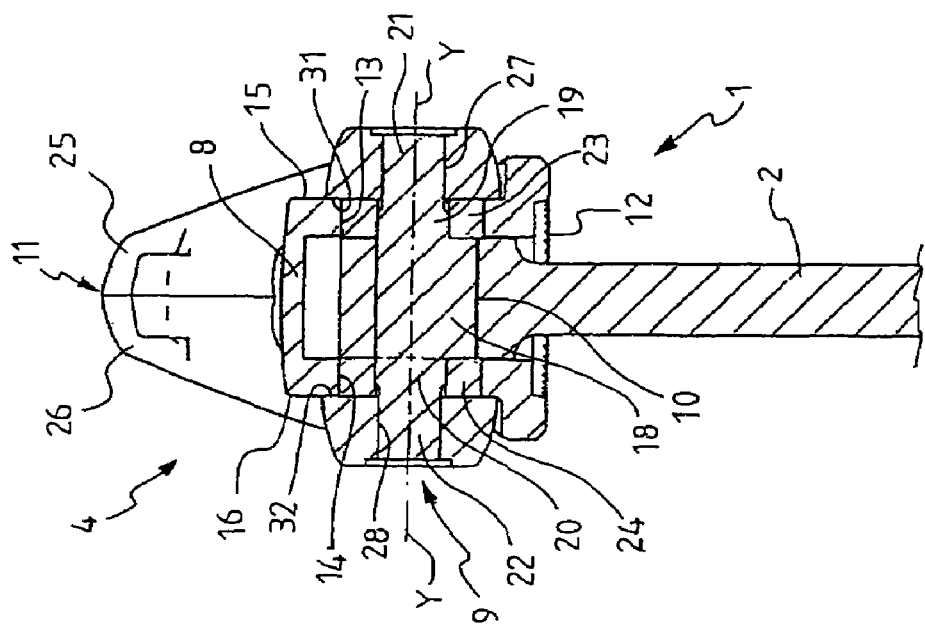
Figure 4:
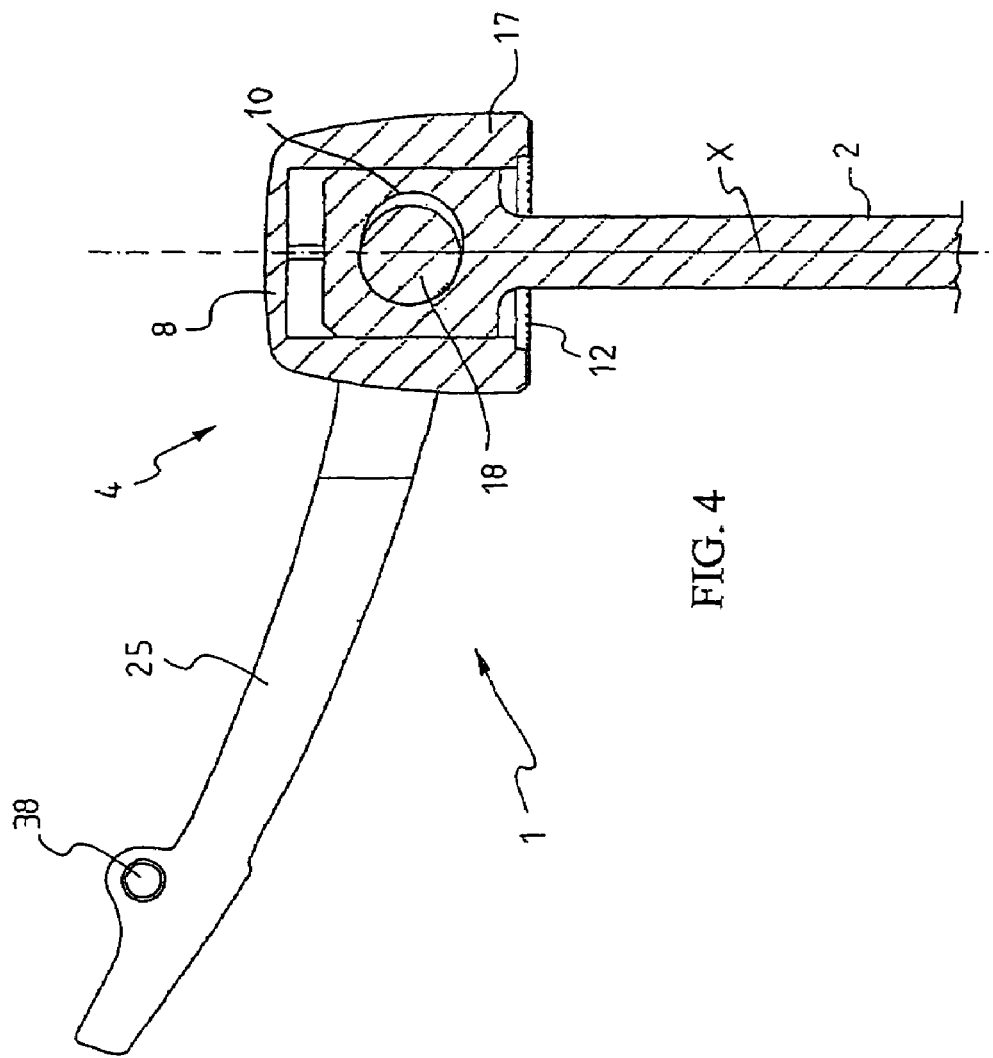
Figure 8:
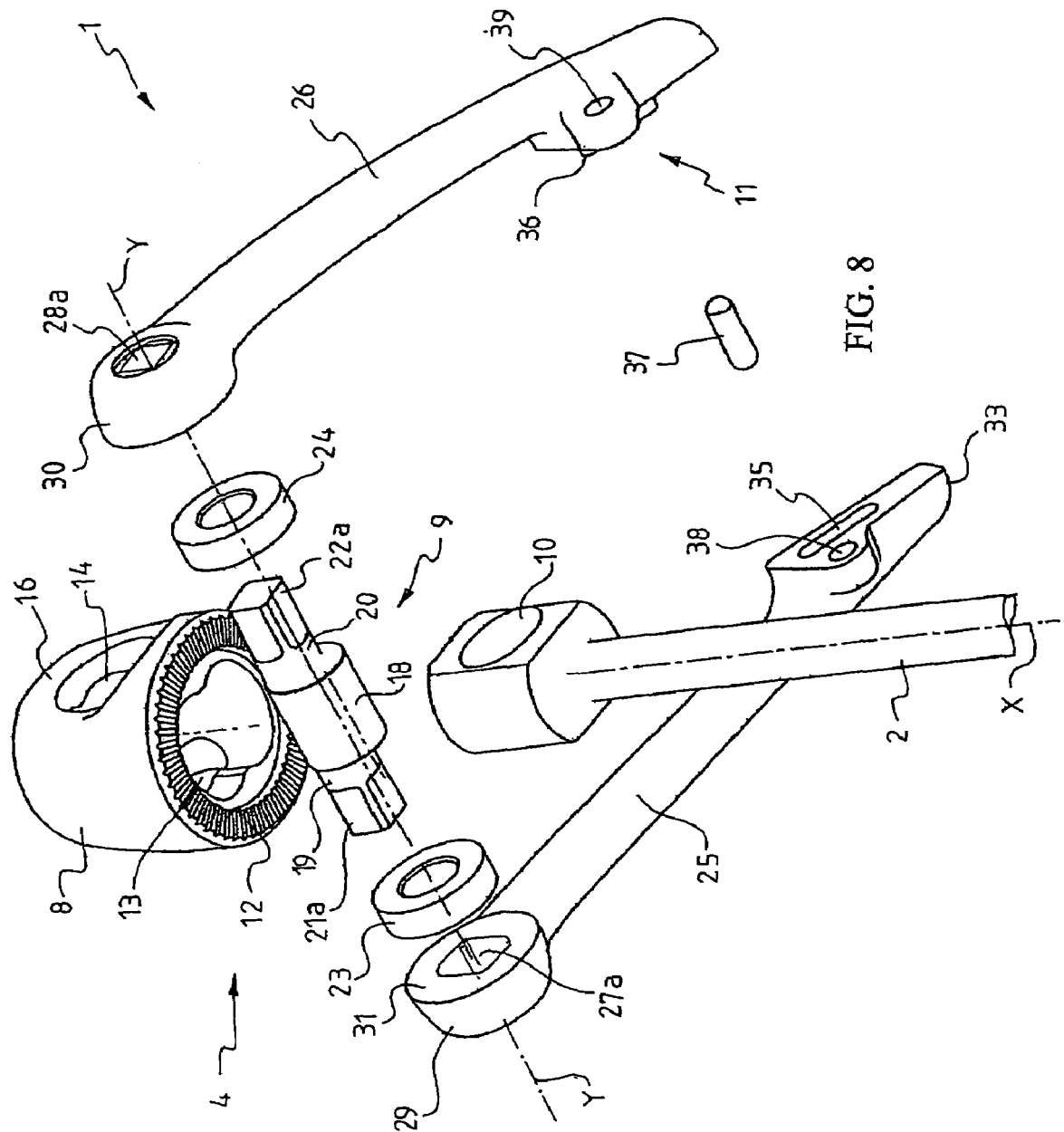
Figure 9:
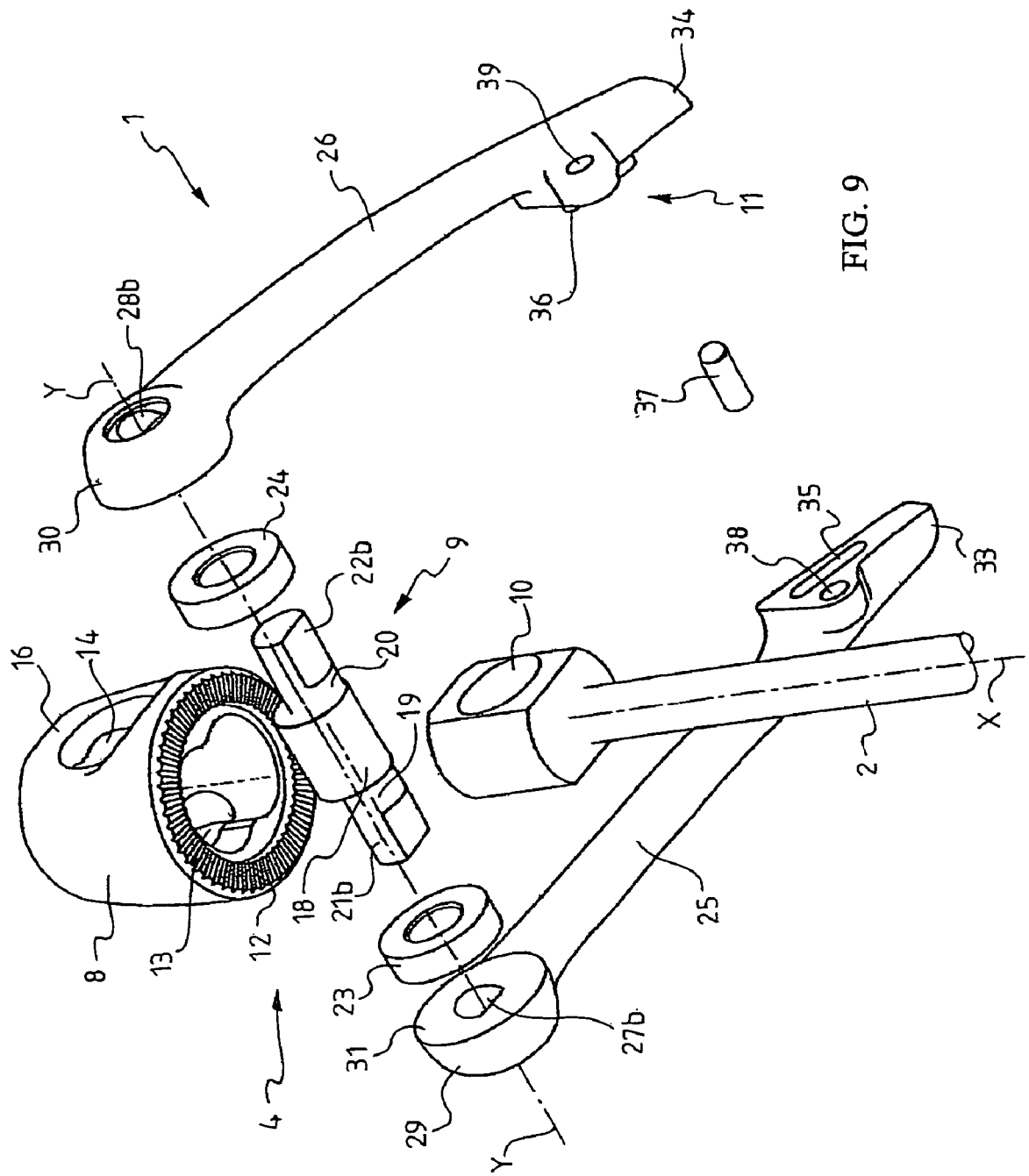
Figure 10:
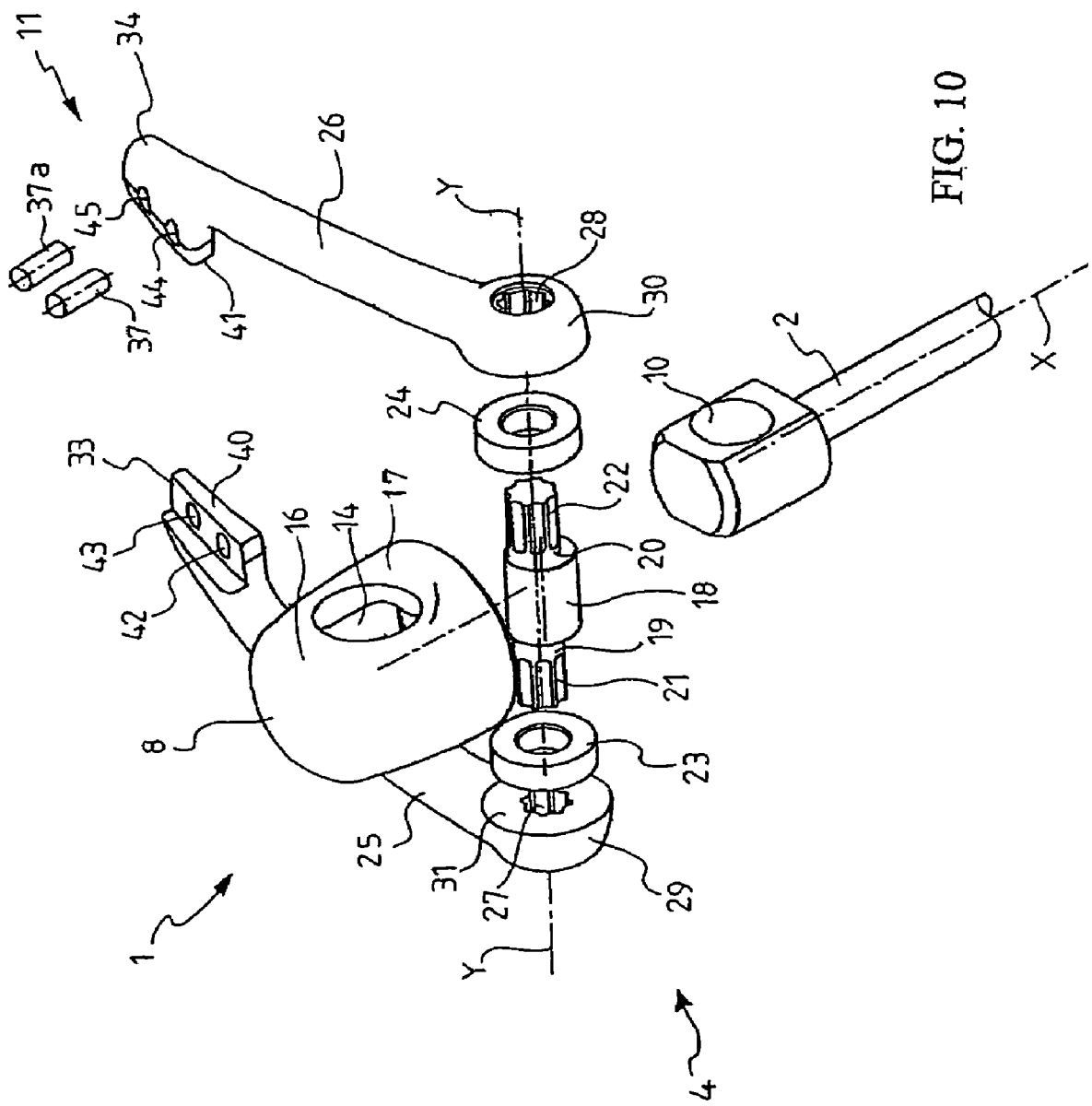
Figure 11:
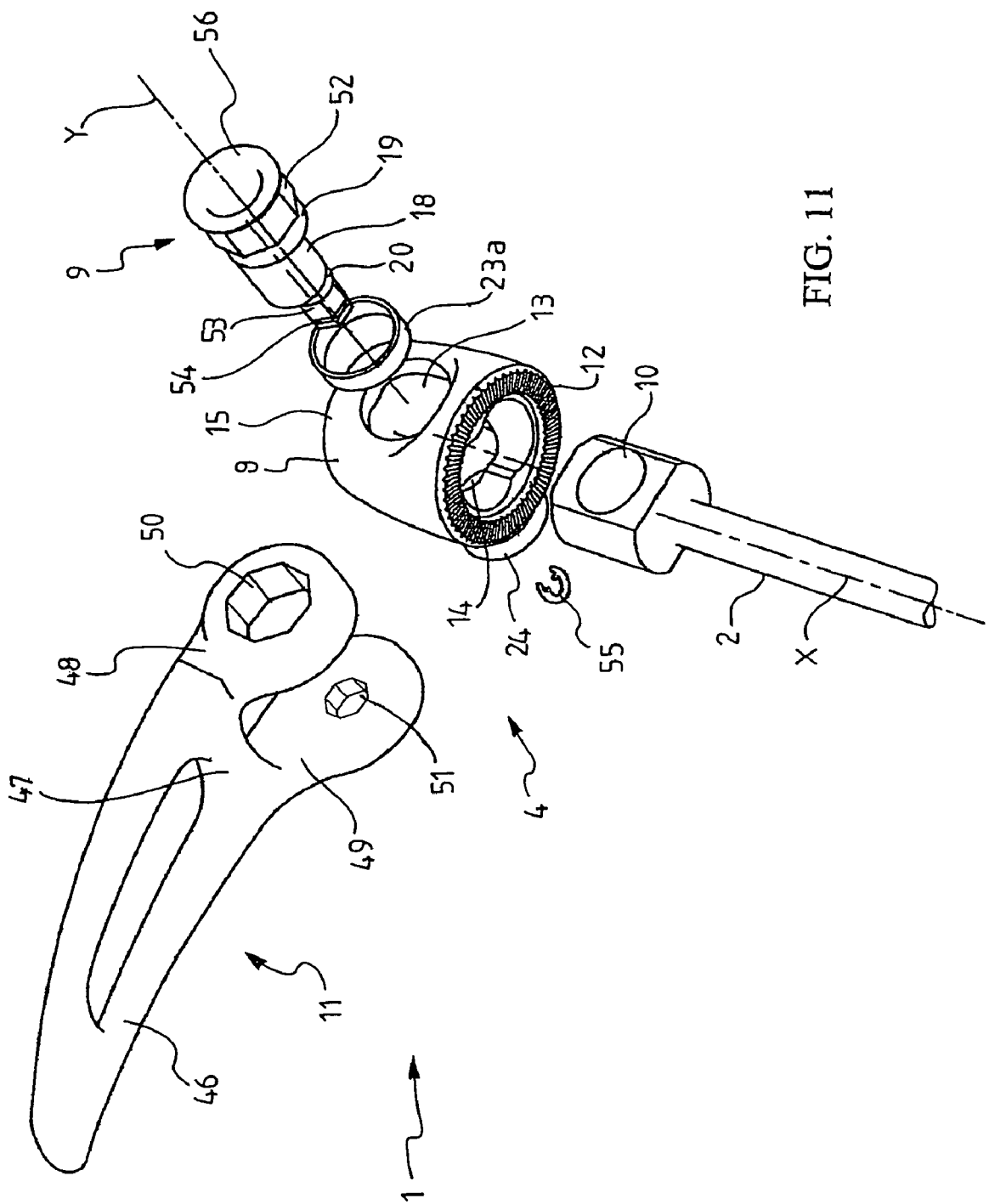
Figure 12:
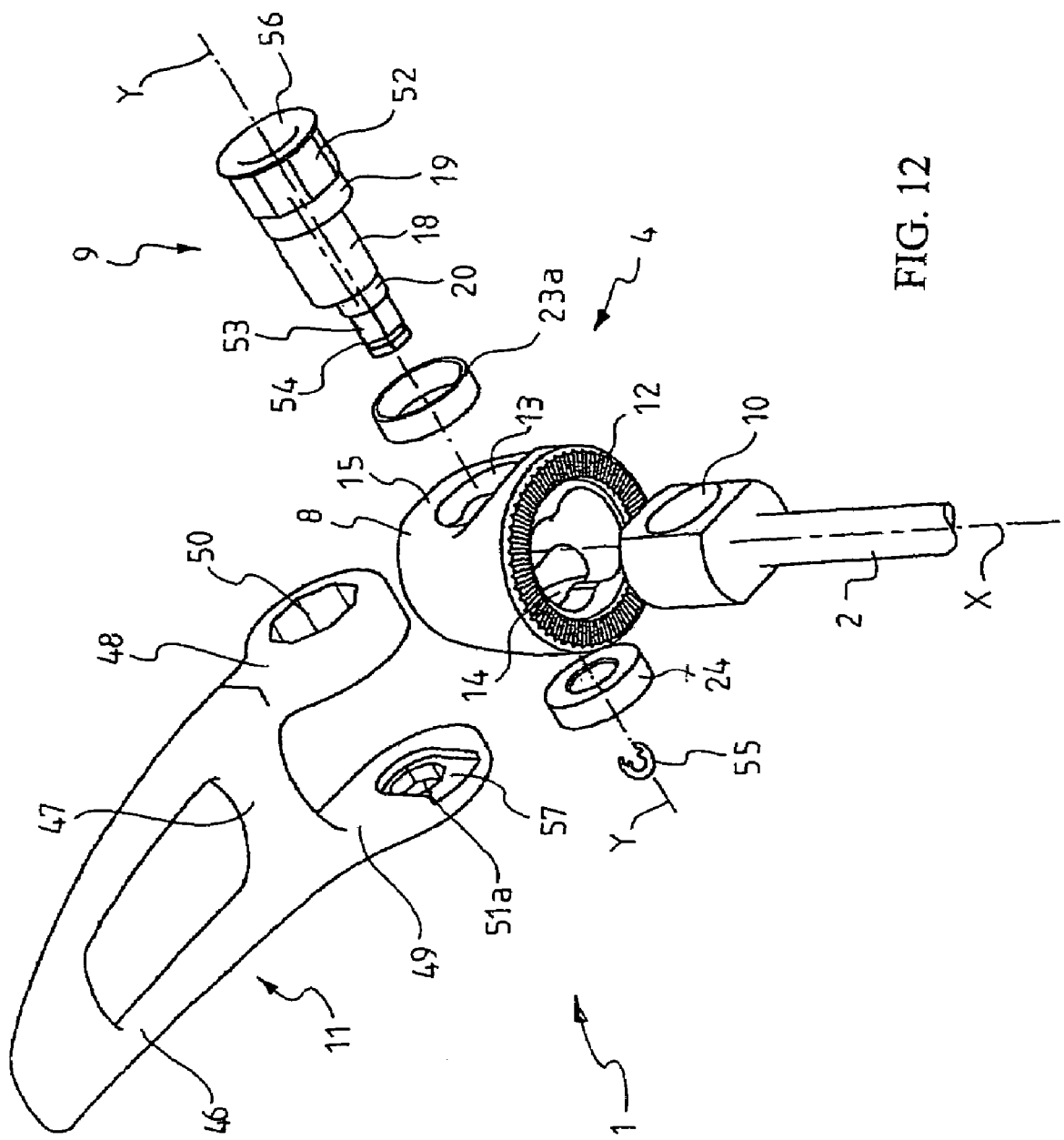
Figure 13:
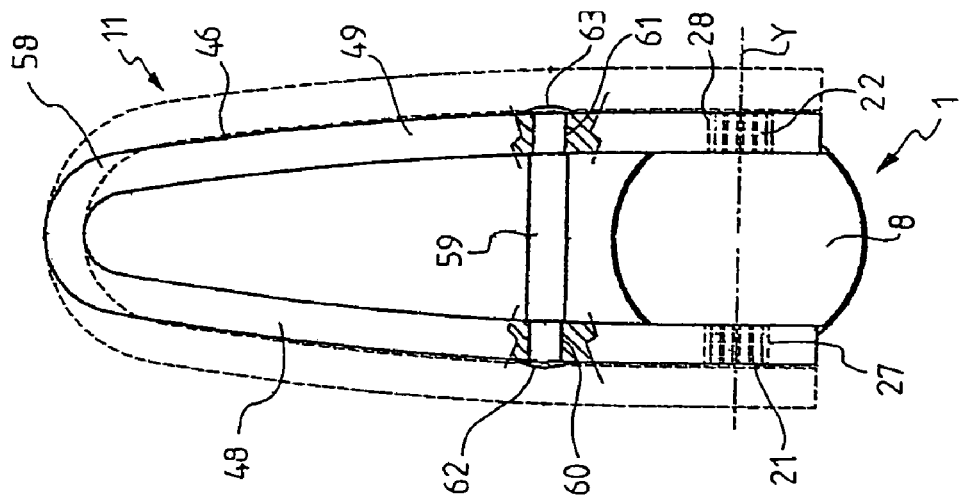
Figure 14:
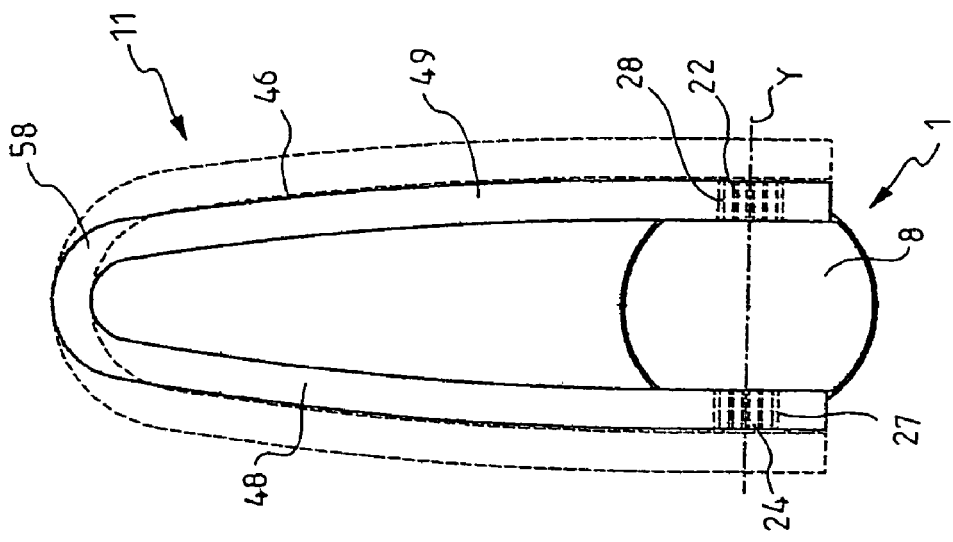
Figure 15:
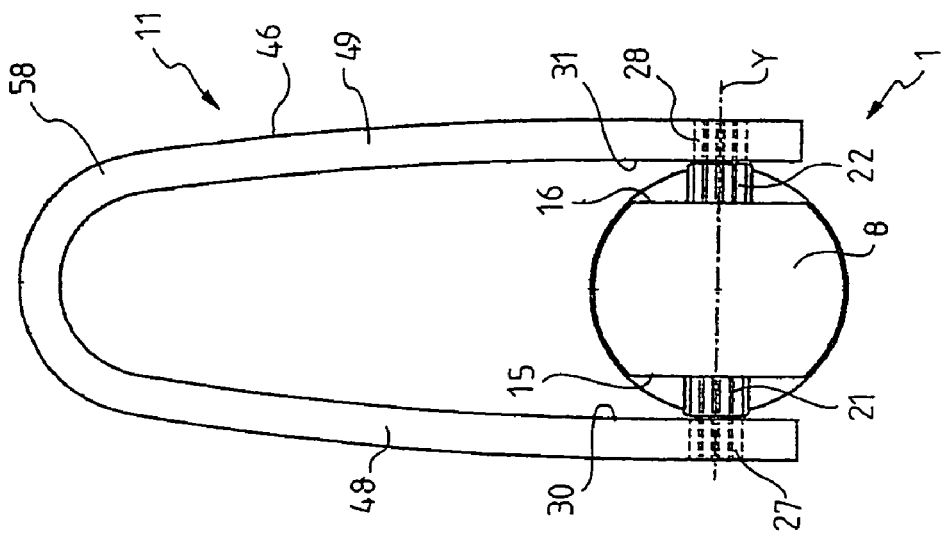

Further characteristics and advantages of the present invention shall become clearer from the following detailed description of some preferred embodiments thereof, made with reference to the attached drawings. In the drawings:

FIG. 1 shows a partially sectioned view of a releasably locking device according to the present invention, in the assembly state of a hub of a wheel to a frame of a bicycle, FIG. 2 is a partial exploded view of a first embodiment of the releasably locking device, FIG. 3 is a partial view of the first embodiment of the releasably locking device, in assembled state, FIGS. 4 and 5 are partial section views of the first embodiment of the releasably locking device, in a release operating condition, FIGS. 6 and 7 are partial section views of the first embodiment of the releasably locking device, in a clamping operating condition, FIG. 8 is a partial exploded view of a second embodiment of the releasably locking device, FIG. 9 is a partial exploded view of a third embodiment of the releasably locking device, FIG. 10 is a partial exploded view of a fourth embodiment of the releasably locking device, FIG. 11 is a partial exploded view of a fifth embodiment of the releasably locking device, FIG. 12 is a partial exploded view of a sixth embodiment of the releasably locking device, FIGS. 13 and 14 are diagrammatic side views of a seventh embodiment of the releasably locking device, and FIG. 15 is a diagrammatic side view of an eighth embodiment of the releasably locking device.

DETAILED DESCRIPTION OF THE PREFERRED EMBODIMENT(S)

Introduction

Generally stated, the invention concerns a releasably locking device for securing a bicycle component to a bicycle frame having aligned holes, comprising:

a traction rod for the passage in said aligned holes of the component and of the bicycle frame, the traction rod having a first end equipped with an abutment widening at said aligned holes and a second end having a through hole, and a clamping element comprising:

a housing having an abutment surface at said aligned holes, and two aligned through openings in a side wall thereof, a rotation cam extending between the through openings of the housing and the through hole of the second end of the traction rod, a lever-operated manual actuation system for driving the rotation of the rotation cam between a clamping operating position wherein the traction rod forces the abutment widening and the abutment surface towards each other, and a release position wherein the traction rod forces the abutment widening and the abutment surface apart, wherein said rotation cam comprises two ends drivable into synchronous rotation through said lever-operated manual actuation system.

Through the provision according to the invention, the securing and release force imparted by the operator on the lever-operated actuation system is transmitted to the rotation cam at both of its ends and therefore in a balanced way, without the formation of a torque with respect to a non-driven end. The force is transmitted from the rotation cam to the traction rod in a more distributed manner on the entire cam surface, resulting in equally distributed stress and lower wear compared to the prior art.

Preferably, the rotation cam comprises an eccentric central portion, two cylindrical portions adjacent to the eccentric portion and said two end portions.

Preferably, moreover, the clamping element comprises a pair of centering rings placed between said cylindrical portions of the rotation cam and said aligned openings of the sidewall of the housing.

In some embodiments, said lever-operated manual actuation system comprises a pair of levers, a first end of each lever and a respective end portion of the rotation cam having matching means so that they are coupled for integrally rotating.

The levers are preferably curved, with the second ends closer together, so as to allow simultaneous actuation with just one hand.

Said levers can comprise mutual alignment and/or coupling means.

The mutual alignment and/or coupling means can comprise a groove on a first lever and a projection with a matching shape on the second lever.

Alternatively, the mutual alignment and/or coupling means can comprise a pair of staggered protrusions.

Alternatively or in addition, the mutual alignment and/or coupling means can comprise at least one pin extending between a hole of the first lever and a hole of the second lever.

Alternatively, the matching mutual alignment and/or coupling means can consist of mechanical interference between the end portions of the rotation cam and the holes of the levers, riveting of the end portions of the rotation cam, preferably by caulking, or else gluing.

In other embodiments, said lever-operated manual actuation system comprises a fork lever, each branch of the fork lever and a respective end portion of the rotation cam having matching means so that they are coupled for integrally rotating.

When the lever-operated manual actuation system comprises a single fork lever, in a first variant embodiment, the connection between the branches of the fork lever is made with higher yield than the branches of the fork lever to allow the assembly of the branches of the lever around the end portions of the rotation cam, the branches of the fork lever then being brought closer together by deforming the connection, for example through pressing in a shaped mould.

A locking pin can extend between a pair of holes formed in an intermediate position of the branches of the single fork lever, the ends of the locking pin being riveted, preferably by caulking. The locking pin allows the mechanical rigidity of the clamping element to be increased and allows a more precise centering of the rotation cam with respect to the branches of the single fork lever.

In a second variant embodiment, the single fork lever is rigid, a hole of a branch of the lever, intended for coupling for integrally rotating with an end portion of the rotation cam, being sized for the passage of the rotation cam, means for axially locking the rotation cam in the single fork lever being provided.

Preferably in such a case the end portions of the rotation cam have different cross-section sizes.

The axial locking means can comprise at least one peripheral groove for housing a locking Seeger ring at at least one end portion of the rotation cam.

The axial locking means can further comprise an abutment edge at an end portion of the rotation cam.

In the various embodiments, the end portions of the rotation cam and the lever actuation system are coupled through matching means so as to integrally rotate.

The matching means for integrally rotating coupling can comprise a shape coupling selected from a knurling, a polygonal cross section and a circular cross section with a flattening.

Typically, the widening at the first end of the traction lever consists of a nut-like clamping element screwed onto a threading at the first end of the traction rod.

In particular, the bicycle component is a wheel hub.

In a second aspect thereof, the invention concerns a clamping element for a device for securing a bicycle component to a bicycle frame, comprising:
  a housing having a surface for abutment against an abutment wall and two aligned through openings in a side wall thereof,
  a rotation cam extending between the through openings of the housing and a through hole of an end of the traction rod, and
  a lever-operated manual actuation system for commanding the rotation of the rotation cam between a clamping operating position wherein the traction rod forces the housing of the clamping element in abutment against said abutment wall, and a release position wherein the traction rod forces the housing of the clamping element away from said abutment wall,
wherein said rotation cam comprises two end portions that can be commanded into synchronous rotation through said lever-operated manual actuation system.

DESCRIPTION OF THE EMBODIMENTS

FIG. 1 shows a releasably locking device 1 for securing the hub 100 of a wheel to a fork 101 of the frame of a bicycle.

On each of the ends of the branches 102, 103 of the fork 101 a housing hole 104, 105 is formed, open towards the outside through a slide slit 106, 107.

The releasably locking device 1 comprises a traction rod 2 extending in an axial hole 108 of the hub 100 of the wheel and made to slide along the slide slits 106, 107 into the housing holes 104, 105 of the branches 102, 103 of the fork 101. The longitudinal axis common to the traction rod 2 and to the axial hole 108 of the hub 100 is indicated with X.

The releasably locking device 1 further comprises two clamping elements 3 and 4 at the ends of the traction rod 2; these elements 3 and 4 project outwards of the fork 101.

The two clamping elements 3 and 4 can be axially displaced towards each other for an abutment and clamping coupling against the outer surfaces 109, 110 of the branches 102, 103 of the fork 101, so as to secure the hub 100 of the wheel to the frame. To release the hub 100 from the fork 101, the clamping elements 3 and 4 can be axially displaced apart, thus loosening the abutment and clamping coupling and allowing the sliding of the traction rod 2 out from the housing holes 104, 105 along the slide slits 106, 107 of the branches 102, 103 of the fork 101.

A first of the clamping elements 3, indicated with 3 in FIG. 1, comprises, in a known way, a nut 5 that can be screwed onto a threading 6 at a first end of the traction rod 2. The nut 5 comprises an annular head surface 7 for the abutment and clamping coupling against the outer surface 109 of the branch 102 of the fork 101.

The assembly of traction rod 2 and first clamping element 3 can be replaced by a traction rod having a different type of widening, for example an integral widened head, although the use of a nut-like clamping element 3 is preferable since it allows fine adjustment of the stroke between the clamping and release positions of the releasably locking device 1.

The second of the clamping elements 4 comprises a housing 8 for a rotation cam 9 extending in a hole 10 at the second end of the traction rod 2 and a lever actuation system 11 for commanding the rotation of the cam 9. The rotation axis of the cam 9 is indicated with a Y and is perpendicular to the axis X of the traction rod 2.

The housing 8 has an annular head surface 12 for the abutment and clamping coupling against the outer surface 110 of the branch 103 of the fork 101.

The annular head surface 12 of the housing 8 is preferably knurled, to increase the efficiency of the abutment and clamping coupling against the outer surface 110 of the branch 103 of the fork 101.

Through rotation of the cam 9 about axis Y, the housing 8 and the traction rod 2 are brought closer together, with the consequent securing of the hub 100 to the fork 101 through the abutment and clamping coupling of the head surfaces 7 and 12 of the clamping elements 3 and 4 against the outer surfaces 109, 110 of the branches 102, 103 of the fork 101.

With reference to FIGS. 2-7, according to the present invention the housing 8 has a pair of aligned openings 13, 14 in flat facing portions 15, 16 of its side wall 17.

The cam 9 extends between the two aligned openings 13, 14 and in the hole 10 at the second end of the traction rod 2.

More specifically, the cam 9 has an eccentric central portion 18, a pair of cylindrical portions 19, 20 adjacent to the eccentric central portion 18 and a pair of end portions 21, 22.

The eccentric central portion 18 of the cam 9 extends in the hole 10 of the traction rod 2.

The cylindrical portions 19, 20 of the cam 9 extend in the aligned openings 13, 14 of the housing 8 through the interposition of centering rings 23, 24.

The end portions 21,22 of the cam 9 project from the aligned openings 13, 14 of the housing 8 and engage with the lever actuation system 11 so that they are coupled for integrally rotating.

Said lever actuation system 11 comprises, according to the embodiment of the invention of FIGS. 2-7, a first lever 25 and a second lever 26.

Each lever 25, 26 has a hole 27, 28 at a first end 29, 30, with a shape matching the shape of the end portions 21, 22 of the cam 9.

Such matching shapes of the end portions 21, 22 of the cam 9 and of the holes 27, 28 of the levers 25, 26 are such as to create, as stated, an integrally rotating coupling, and are more specifically knurled in the embodiment of FIGS. 2-7.

The first ends 29, 30 of the levers 25, 26 have a flat surface 31, 32 for abutment against the flat portions 15, 16 of the side wall 17 of the housing 8, so as to promote the centered rotation of the levers 25, 26 about the rotation axis Y of the cam 9 and guided along the longitudinal axis X.

The two levers 25, 26 preferably have the converging curved shape shown in FIGS. 2-7, in such a way that their second closer ends 33, 34 can be actuated simultaneously with just one hand by the operator (typically the rider himself), so as to ensure their synchronous rotation about axis Y.

The second ends 33, 34 of the levers 25, 26, preferably but not necessarily, further have alignment and coupling means, represented in FIGS. 2-7 by a groove 35 on the inner wall of lever 25 and a protrusion 36 with a matching shape on the inner wall of lever 26, as well as by a coupling pin 37 extending in holes 38, 39 respectively in the second ends 33, 34 of the levers 25, 26.

In FIGS. 4 and 5, the releasably locking device 1 is partially shown (the first clamping element 3 has been omitted) in the release position. In such a release position, the eccentric portion 18 of the cam 9 and therefore the traction rod 2 are brought closer, through the lever actuation system 11, to the head surface 12 of the housing 8. The length of the portion of traction rod 2 projecting from the housing 8 is therefore at its maximum, allowing the removal of the hub 100 of the wheel from the fork 101.

Through the rotation of about 180° of the lever actuation system 11 about axis Y, the locking device 1 can be taken into the securing position shown, analogously to FIGS. 4, 5, in FIGS. 6 and 7.

In such a securing position, the eccentric portion 18 of the cam 9 and therefore the traction rod 2 are brought away, through the lever actuation system 11, from the head surface 12 of the housing 8. The length of the portion of traction rod 2 projecting from the housing 8 is therefore at its minimum, allowing the locking of the hub 100 of the wheel to the fork 101 through the abutment and clamping coupling of the head surfaces 7, 12 of the clamping elements 3, 4 against the outer surfaces 109, 110 of the branches 102, 103 of the fork 101.

Since the lever actuation system 11 acts in a balanced and synchronous manner on both of the ends 21, 22 of the cam 9, the cam movement of the traction rod 2 is smooth and no torque forms in the cam 9. The useful life of the cam 9 and therefore of the entire releasably locking device 1 is therefore substantially improved with respect to known releasably locking devices wherein the cam is actuated at just one end.

FIGS. 8 and 9 show a second and a third embodiment of the releasably locking device 1, which differ from the one described above with reference to FIGS. 2-7 for the matching shapes of the cross-sections of the end portions of the cam 9 and of the holes of the first ends 29, 30 of the levers 25, 26.

In the embodiment of FIG. 8, the shape is square, whereas in the embodiment of FIG. 9 the shape is cylindrical with a flattening. The end portions of the cam 9 are respectively indicated with 21a, 22a in FIG. 8 and with 21b, 22b in FIG. 9, whereas the holes of the first ends 29, 30 of the levers 25, 26 are respectively indicated with 27a, 28a in FIG. 8 and with 27b, 28b in FIG. 9.

Other shapes or other means that allow an integrally rotating coupling could be used.

For example, the matching means for coupling the ends of the cam with the lever actuation system so that they integrally rotate could be inverted, i.e. providing projections at the levers and holes at the cam.

Furthermore, the matching means for coupling the ends of the cam with the lever actuation system so that they integrally rotate could consist of mechanical interference, of a Seeger ring (see hereinbelow the description of the embodiments of FIGS. 11, 12), of riveting of the end portions of the cam for example through caulking, or of an adhesive substance.

FIG. 10 shows a fourth embodiment of the releasably locking device 1 that differs from the one described above with reference to FIGS. 2-7 for the alignment and coupling means of the two levers 25, 26.

They provide for two flat protrusions 40, 41 staggered at the second ends 33, 34 of the levers 25, 26 and two pins 37, 37a fitted in holes 42-45 in the protrusions 40, 41.

FIG. 11 partially shows a fifth embodiment of the releasably locking device 1, wherein the lever actuation system 11 comprises, instead of the two levers 25, 26, a single fork lever 46. A cross member 47 extends between the two branches 48, 49 of the fork lever 46 to ensure the mechanical solidity and the interspacing of the branches 48, 49 of the fork lever 46.

The cam 9 is modified with respect to that of the previous embodiments in order to be inserted in the single fork lever 46 from the outside, through the hole 50 of a first branch 48 of the fork lever 46 up to the hole 51 of the second branch 49 of the fork lever 46, and to be secured against displacements along the axis Y with respect to the fork lever 46 itself.

In particular, a first end portion 52 has a greater cross section size than the eccentric central portion 18, whereas a second end portion 53 of the cam 9 has a smaller cross section size than the eccentric central portion 18.

At the second end portion 53 of the cam 9 a groove 54 is provided, in which a tightening Seeger ring 55 is received, in other words an elastic split ring which, upon complete insertion of the cam 9, is inserted into the groove 54 and abuts against the outer surface of the branch 49 of the fork lever 46.

At the first end portion 52 of the cam 9 an abutment edge 56 is provided which, upon complete insertion of the cam 9, abuts against the outer surface of the branch 48 of the fork lever 46.

When, as shown, the first cylindrical portion 20 of the cam 9 is of a greater size than the second cylindrical portion 21, the centering ring, indicated with 23a, is correspondingly thinner than the centering ring 24.

The end portions 52, 53 of the cam 9 and the holes 50, 51 of the branches 48, 49 of the fork lever 46 have an octagonal cross section in FIG. 11, but they could of course be any other shape suitable for coupling so as to integrally rotate.

Moreover, the abutment edge 56 can be missing or replaced by a second Seeger ring at the first end portion 52 of the cam 9.

FIG. 12 partially shows a sixth embodiment of the releasably locking device 1 with lever actuation system 11 having a single fork lever 46. The embodiment of FIG. 12 differ from that of FIG. 11 in that the hole, indicated with 51a, in the second branch 49 of the fork lever 46 is blind. At the blind hole 51a, an open slot 57 having a semi-circular portion suitable for receiving the centering ring 24 is further provided. The Seeger ring 55, in such an embodiment, is sandwiched between the bottom of the open slot 57 and the centering ring 24.

FIGS. 13 and 14 diagrammatically show a seventh embodiment of the releasably locking device 1 with lever actuation system 11 having a single fork lever 46, seen from the outer side of the fork 101.

In this embodiment, the two branches 48, 49 of the fork lever 46 are connected to each other through a connection portion 58 with greater yield than that of the branches 48, 49. The opening of the branches 48, 49 of the fork lever 46 and/or the yield of the connection portion 58 are such as to allow the engagement of the holes 27, 28 on the end portions 21, 22 of the cam 9 during the assembly of the releasably locking device 1. The assembled position of the fork lever 46 is shown in FIG. 13 and with a broken line in FIG. 14.

The holes 27, 28 of the branches of the fork lever 46 and the cam 9 can therefore be designed like in any of the embodiments described above with reference to FIGS. 1-10.

Once the cam 9 has been coupled with the holes 27, 28 of the branches 48, 49 of the fork lever 46, the yielding connection portion 58 is deformed, for example through pressing in a suitably shaped mould.

The assembled position of the fork lever 46 is shown with a solid line in FIG. 14.

FIG. 15 diagrammatically shows an eighth embodiment of the releasably locking device 1 with lever actuation system 11 having a single fork lever 46, from the outer side of the fork 101.

This embodiment differs from the one just described with reference to FIGS. 13 and 14 in that it provides a locking pin 59 extending between holes 60, 61 in an intermediate position of the two branches 48, 49. The ends of the pin 59 projecting outwards from the branches 48, 49 of the fork lever 46 have a riveting 62, 63, preferably obtained by caulking.

The locking pin 59 allows the mechanical rigidity of the releasably locking device 1 to be increased and allows the precision of the centering between the cam 9 and the aligned holes 27, 28 of the fork lever 46 to be ensured.

The clamping element 4 in which the inventive concepts are incorporated can also be manufactured and marketed independently from the rest of the releasably locking device 1 for use in a releasably locking device according to the prior art, and therefore it constitutes an independent inventive aspect of the present invention.

Moreover, although described above with reference to securing a wheel to a bicycle frame, those skilled in the art will understand that the releasably locking device 1 of the invention or, respectively, the clamping element 4 can also have an application for securing other components to the bicycle frame, for example the saddle or the handlebars.

It should also be understood that numerous modifications, variants, replacements, omissions or additions can be brought to the embodiments described above without departing from the scope of the attached claims.

For example, the centering rings 23, 23a, 24 could be replaced by bushes projecting from the levers 25, 26 or from the branches 48, 49 of the fork lever 46.

The locking pin 59 of the embodiment of FIG. 15 could be replaced for example by two integral elements projecting inwards from the two branches 48, 49 of the fork lever 46, joined at the free ends through suitable attachment means, for example one or more screws, welding or gluing.

What is claimed is:

1. A releasably locking device for securing a bicycle component to a bicycle frame having aligned holes comprising:
   a traction rod configured to pass through said aligned holes of the component and of the bicycle frame, the traction rod having a first end equipped with an abutment widening at one of said aligned holes and a second end having a through hole; and
   a clamping element comprising:
      a housing having an abutment surface at the other one of said aligned holes, and two aligned through openings in a side wall thereof;
      a rotation cam extending between the through openings of the housing and the through hole of the second end of the traction rod, and comprising two end portions that can be commanded into synchronous rotation; and a lever-operated manual actuation system that commands into synchronous rotation the end portions of the cam and that drives the cam between a clamping operating position wherein the traction rod forces the abutment widening and the abutment surface towards each other, and a release position wherein the traction rod forces the abutment widening and the abutment surface apart;

wherein said lever-operated manual actuation system comprises a pair of separately formed levers, a first end of each lever and a respective end portion of the rotation cam being coupled for integrally rotating; and wherein a second end of each lever comprises one of corresponding first and second mating portions comprising at least one of alignment means for aligning the first and second levers and coupling means for coupling the first and second levers to each other.

2. The device of claim 1 wherein the rotation cam comprises an eccentric central portion, two cylindrical portions adjacent to the eccentric portion, and said two end portions.

3. The device of claim 2 wherein the clamping element comprises a pair of centering rings, each placed between said cylindrical portions of the rotation cam and said aligned openings of the side wall of the housing.

4. The device of claim 1 wherein the levers are curved and have second ends closer to each other than the first ends when the first ends are matingly engaged to the end portions of the rotation cam.

5. The device according to claim 1 wherein the alignment means and/or coupling means comprise a groove on a first lever and a projection with a matching shape on the second lever.

6. The device of claim 1 wherein the alignment means and/or coupling means comprise a pair of staggered protrusions.

7. The device of claim 1 wherein the alignment means and/or coupling means comprise at least one pin extending between a hole of the first lever and a hole of the second lever.

8. The device of claim 1 wherein the alignment means and/or coupling means comprise a mechanical interference between the end portions of the rotation cam and the holes of the levers, riveting or gluing of the end portions of the rotation cam.

9. The device of claim 1 wherein the end portions of the rotation cam and the lever actuation system are coupled for integrally rotating using a means for coupling.

10. The device of claim 9 wherein the means for coupling the rotation cam and the lever actuation system comprises a shape-fitted coupling selected from the group consisting of: a knurling, a polygonal cross section, and a circular cross section with a flattened portion.

11. The device of claim 1 wherein the abutment widening at the first end of the traction rod comprises a nut-like clamping element screwed onto a threading at the first end of the traction rod.

* * * * *